United States Patent [19]

Weiss et al.

[11] Patent Number: 5,533,104
[45] Date of Patent: Jul. 2, 1996

[54] TELEPHONE ANSWERING DEVICE AND METHOD

[76] Inventors: Mark H. Weiss, 49 Bilmore Estates, Phoenix, Ariz. 85016; Michael I. Rackman, 1710 Glenwood Rd., Brooklyn, N.Y. 11230; Harry M. Weiss, 49 Biltmore Estates, Phoenix, Ariz. 85016

[21] Appl. No.: 961,071

[22] Filed: Oct. 14, 1992

Related U.S. Application Data

[63] Continuation-in-part of Ser. No. 719,820, Jun. 24, 1991, abandoned.

[51] Int. Cl.$^6$ .......................... H04M 9/06; H04M 11/10
[52] U.S. Cl. ................. 379/70; 379/442; 379/211; 379/212; 379/210; 379/74; 379/77; 379/67
[58] Field of Search .................. 379/70, 79, 82, 379/67, 441, 165, 84, 76, 63, 61, 213, 212, 93, 78, 77, 199, 442, 205, 211, 75, 34, 35, 68, 66, 62, 56, 52

[56] References Cited

U.S. PATENT DOCUMENTS

| | | | |
|---|---|---|---|
| 4,052,569 | 10/1977 | Pirnie, III | 379/212 |
| 4,367,374 | 1/1983 | Serrano | 379/93 |
| 4,446,335 | 5/1984 | Lee et al. | 379/85 |
| 4,813,070 | 3/1989 | Humphreys et al. | 379/213 |
| 4,893,328 | 1/1990 | Peacock | 379/67 |
| 4,903,289 | 2/1990 | Hashimoto | 379/67 |
| 4,916,726 | 4/1990 | Morley, Jr. et al. | 379/84 |
| 4,974,253 | 11/1990 | Hashimoto | 379/100 |
| 5,003,575 | 3/1991 | Chamberlin et al. | 379/77 |
| 5,014,299 | 5/1991 | Klupt et al. | 379/98 |
| 5,023,903 | 6/1991 | Bowen | 379/67 |
| 5,056,132 | 10/1991 | Coleman et al. | 379/88 |
| 5,062,133 | 10/1991 | Melrose | 379/211 |
| 5,121,422 | 6/1992 | Kudo | 379/67 |
| 5,172,404 | 12/1992 | Hashimoto | 379/67 |
| 5,202,915 | 4/1993 | Nishii | 379/100 |

OTHER PUBLICATIONS

AT&T "Cordless Answering System 5600 Owner's Manual"; 1990; pp. 5 & 34.

*Primary Examiner*—Jeffery Hofsass
*Assistant Examiner*—Scott Wolinsky
*Attorney, Agent, or Firm*—Harry M. Weiss; Jeffrey D. Moy; Harry M. Weiss & Associates

[57] ABSTRACT

A telephone answering device for permitting a person to switch an incoming telephone call to a message recording or answering machine for taking or recording a message from a caller onto at least one cassette of the message recording or answering machine. This device includes a telephone instrument, at least one message recording or answering machine, and a person actuated switch. The person actuated switch has a first "normal" position to permit a person to receive calls using the telephone instrument and a second position for permitting a person to switch the caller to the message recording or answering machine after the person has initially spoken to the caller.

8 Claims, 2 Drawing Sheets

TELEPHONE ANSWERING DEVICE AND METHOD

CROSS-REFERENCE TO RELATED APPLICATION

This patent application is a continuation-in-part of U.S. patent application Ser. No. 07/719,820, filed Jun. 24, 1991, now abandoned.

FIELD OF THE INVENTION

This invention generally relates to a telephone answering device and method, and in particular this invention relates to a telephone answering device and method which uses switch means controllable by a person receiving or answering a telephone call to subsequently switch the answered call to an answering machine for recording a message or information from the caller.

BACKGROUND OF THE INVENTION

In many homes and offices, the prior art telephone answering device usually included a telephone unit and an answering machine connected to the telephone line that served to record messages in the event that nobody was able to pick up the handset portion of the telephone unit to handle the incoming telephone call.

U.S. Pat. No. 2,531,203 discloses a telephone substation coupler for conversation recording which permits a subscriber to record the conversation between his station and another station. There is no disclosure nor suggestion of permitting a person to receive a call and then switch the call to a message recording device which permits the person receiving the call to hang up without affecting the message being recorded on the message recording device.

U.S. Pat. No. 2,886,640 discloses telephone answering and recording devices for automatically answering a telephone, recording a message delivered by the calling party, or recording a two-way telephone conversation, and having means for playing back the recorded message. There is no disclosure nor suggestion of permitting a person to receive a call and then switch the call to a message recording device which permits the person receiving the call to hang up without affecting the message being recorded on the message recording device.

U.S. Pat. No. 4,071,710 discloses a fairly complex communication system which permits master stations to be selectively interconnected to a plurality of shared amplifiers. There is no disclosure nor suggestion of permitting a person to receive a call and then switch the call to a message recording device which permits the person receiving the call to hang up without affecting the message being recorded on the message recording device.

U.S. Pat. No. 4,117,266 discloses a connection across telephone lines that permits a recorder to be activated by lifting the handset. When the handset is replaced, the recorder is shut off. There is no disclosure nor suggestion of permitting a person to receive a call and then switch the call to a message recording device which permits the person receiving the call to hang up without affecting the message being recorded on the message recording device.

U.S. Pat. No. 4,500,752 discloses a cordless telephone system wherein a tape recorder operable by a membrane touch and remote from the telephone records the speech content and also permits playback of the speech content in the remote unit. There is no disclosure nor suggestion of permitting a person to receive a call and then switch the call to a message recording device which permits the person receiving the call to hang up without affecting the message being recorded on the message recording device.

U.S. Pat. No. 3,794,767 discloses a control circuit for a telephone answering set wherein the record-play switch of a message tape deck is coupled to a two position switch to enable a telephone answering set in automatic answer and message playback conditions. There is no disclosure nor suggestion of permitting a person to receive a call and then switch the call to a message recording device which permits the person receiving the call to hang up without affecting the message being recorded on the message recording device.

U.S. Pat. No. 4,833,704 discloses a telephone answering device with an automatic switching mechanism for switching between an automatic answering mode and a two-way conversation recording mode, however, there is no disclosure nor suggestion of permitting a person to receive a call and then switch the call to a message recording device which permits the person receiving the call to hang up without affecting the message being recorded on the message recording device.

U.S. Pat. No. 4,862,509 discloses a portable system for recording telephone conversations which uses a battery-powered sound recorder carried by the user. There is no disclosure nor suggestion of permitting a person to receive a call and then switch the call to a message recording device which permits the person receiving the call to hang up without affecting the message being recorded on the message recording device.

U.S. Pat. No. 4,387,272 discloses an ordinary answering machine that is connected to the line if subscriber does not answer the cable. In addition, a code is transmitted for informational purposes to tell the called party who is calling. If the called party elects not to answer the call, the answering machine is connected to the line so that recording can take place. There is no disclosure nor suggestion of permitting a person to receive a call and then switch the call to a message recording device which permits the person receiving the call to hang up without affecting the message being recorded on the message recording device.

U.S. Pat. No. 5,029,198 discloses a system in which a user selects one of a plurality of call response messages by activating the control key of the responder system that corresponds to the desired message. There is no disclosure nor suggestion of permitting a person to receive a call and then switch the call to a message recording device which permits the person receiving the call to hang up without affecting the message being recorded on the message recording device.

One significant problem with these prior art telephone answering systems or devices is that there is no way to record information on an answering or message recording machine after a person actually picked up the call on the handset of the telephone unit. Very often, a person picking up an incoming telephone call on the handset of a telephone unit or on a speaker phone discovered that the call was for someone else in their office or residence; i.e., for a friend or family member such as for one of the children or a spouse. In this situation, there was usually the frantic rush to locate a writing instrument and some paper to record the phone number, the name and possibly a brief message from the caller. If the materials were not present to write down the number, name and message from the caller, then the person receiving the call was required to use their memory to at least try to remember the name of the caller and to not forget to tell the person for whom the call was intended.

Fairly complex telephone systems such as PBX systems and even recent voice mail systems endeavored to receive and record incoming calls especially for the business environment. These fairly complex telephone systems were usually computer controlled and very elaborate or sophisticated and therefore extremely expensive.

Accordingly, there was a need to provide a telephone answering device that could be simply attached or coupled to any conventional telephone unit and that would permit a person picking up or answering a call on the handset of the telephone unit or using a speaker phone to be able to personally switch the incoming call to a message recording machine and thereafter permit the receiver of the call to be able to "hang up" and still permit the caller to continue talking to leave a message on the message recording device.

SUMMARY OF THE INVENTION

Therefore, it is an object of this invention to provide an improved telephone answering device and method.

It is a further object of this invention to provide an improved telephone answering device and method which permits a person receiving an incoming call to be able to personally switch the incoming call to a message recording device after speaking to the caller and determining that the call is either for another party or that the message should be recorded on a message recording device. The foregoing and other objects, features and advantages will be apparent from the following description of the preferred embodiment of the invention as illustrated in the accompanying drawings.

BRIEF DESCRIPTION OF THE PREFERRED EMBODIMENTS

According to the present invention, a telephone answering device and method is provided. This device comprises a telephone unit, at least one telephone answering or message recording machine coupled to the unit, and a person actuated switching means coupled to the telephone unit and to the telephone answering or message recording machine for permitting a person to switch a call received on the telephone unit from a caller to the answering or recording machine for recording a message from the caller after first speaking to the caller. By using this device, the problem of not being able to hang up the call, but yet still permit the caller to record a message or information on the answering or recording machine after a person answers the call is avoided.

The telephone answering method of this invention comprises the steps of providing a telephone unit, coupling a telephone answering or message recording machine to the telephone unit, and coupling a person activated switching means to the telephone unit and to the answering or recording machine for permitting a person to switch a call received on the telephone unit from a caller to the answering machine for recording a message from the caller after first speaking to the caller.

DETAILED DESCRIPTION OF THE PREFERRED EMBODIMENTS

Figure 1:
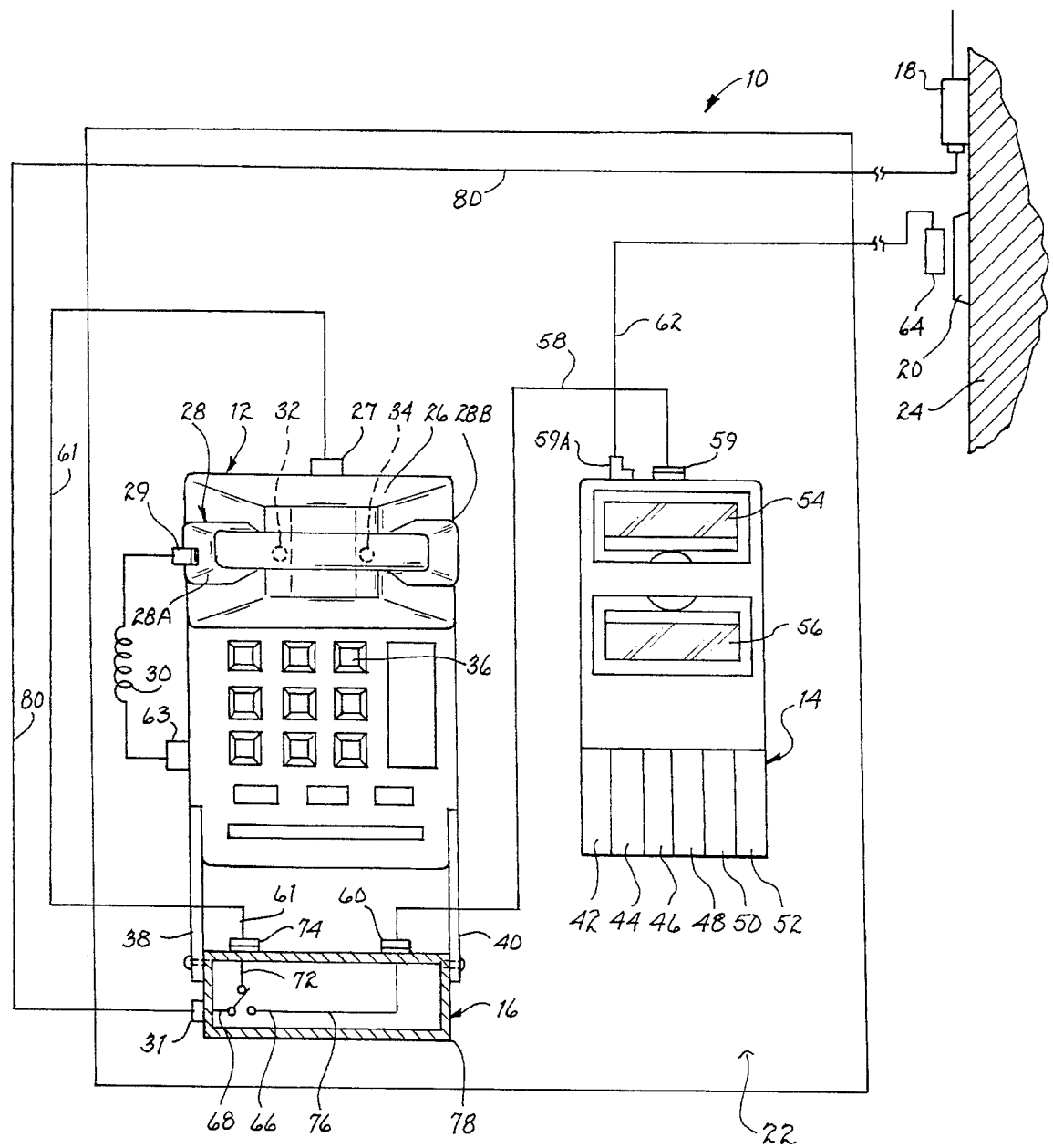
FIG. 1 is a plan view of a telephone answering device according to the invention.

As shown in FIG. 1, a first embodiment of a telephone answering device 10 according to this invention includes a telephone instrument 12, an answering or message recording machine 14, and a switch unit or subassembly 16. The telephone instrument 12 of the device 10 is connected, through switch unit 16 and conductor 80, to a telephone jack 18, while the answering or message recording machine 14 of the device 10 is connected to an electrical (i.e., 110 volt A.C.) power outlet 20 through a line 62. Telephone instrument 12, and answering or message recording machine 14 preferably rest on a table top 22. Telephone jack 18 and electrical power outlet 20 are preferably mounted on a wall 24.

Telephone instrument 12 has a base portion 26, which has an input terminal 27, and has a handset portion 28 containing a speaker 28A and a receiver 28B. A coiled wire 30 is connected by connector 29 to the handset 28 and by connector 63 to the base portion 26. Base portion 26 has two cradle switch extensions 32, 34, for providing operational on-off connection depending upon the position of the hand held portion 28 (whether it is in a hang-up [or off]position on the cradle of the base portion 26 or not on the cradle of the base portion 26 thereby in an off-hook [or on]position). The base portion 26 also has a plurality of Touch-tone type push buttons 36 (this invention can also be similarly implemented for rotary dial-type phones) and preferably has first and second support brackets 38, 40 for supporting switch unit 16.

Answering machine 14 preferably has a microphone or speaker 42, a rewind button 44, a fast-forward button 46, a memo button 48, a call counter display 50, and a cassette select button 52. Answering machine 14 also, preferably, has a first incoming message cassette 54 and a second incoming message cassette 56. If desired, more than two message cassettes can be used (i.e., one for each family member). Answering machine 14 also has an input line 58 connected to connector 59 of the answering machine 14 which is connected to output connector 60 that is connected to switch unit 16. A power line 62 is provided from electrical power outlet 20 to provide electrical power for operating the various functions of the answering machine 14. Lines 58, 61 and 80 are conventional telephone lines with pinch-type end connectors. Line 61 provides a connection from the switch unit 16 to input terminal 27 that is connected to the base portion 26. In the absence of the present invention, input terminal 27 would be, of course, connected to telephone Jack 18. As shown in FIG. 1, power line 62 preferably has a 120 volt transformer 64 which connects power outlet 20 to connector 59A.

Also, as shown in FIG. 1, switch unit 16, which is preferably supported by brackets 38, 40 from base portion 26 has a three-way switch 66 that is electrically connected to line 68. Line 68 is electrically connected to connector 31 and thereby electrically connects switch unit 16 through line 80 to telephone jack 18. In one direction, depending upon the position of the switch 66, as shown in FIG. 1, switch 66 connects line 80, through lines 68 and 72, connector 74, and line 61 to input terminal 27. If switch 66 is in the other position, then lines 80 and 68 are connected through the switch 66 to line 76 which is connected to the connector 60 that is connected via the line 58 to the connector 59 that is connected to the answering machine 14.

In operation, a telephone call is received by telephone instrument 12 (if desired, this invention can be utilized with speaker phones or other types of telephone units) by means of line 80 connected to the telephone jack 18 and the base portion 26. A person hearing the ring of the ringer (not shown) generated by the telephone call, picks up the handset portion 28 to speak to the caller. In this situation, the switch 66 is in the position which electrically connects line 80 through the connector 31, the line 68, the switch 66, the line 72, the connector 74, the line 61 and the line 61 to the base portion 26 of the telephone instrument 12 at input terminal 27. If the person receiving the call on the telephone instrument 12 determines that the caller really wants to talk to someone else, then the person operates the switch to thereby switch the caller to the answering machine 14 to permit the caller to leave a message on the answering machine 14. The person switching the call to the answering machine 14 can, if desired, select, by means of the cassette selector button 52, the particular cassette (54 or 56) to receive the message. Operation of the switch 66 serves to permit the person receiving the call to switch the caller to the answering machine 14 because of the connection from line 80, through the connector 31, the line 68, the switch 66 (which is now in the switched position to direct the call to the answering machine 14), the line 76, the connector 60, the line 58, and the connector 59 to the answering machine 14. Once the person answering the call switches the caller to the answering machine, the person answering the call may then "hang up" the telephone without disconnecting the caller from the answering machine. Connections (not shown) connect the caller to one of the two cassettes to permit the caller to leave a message on one of the cassettes. The answering machine may begin recording on the selected cassettes immediately upon actuation of the switch 66, or, if desired, a voice activation means may be used to have the answering machine begin recording once the calling party begins speaking.

Switch 66 may be moved manually back to its original position (shown in the drawing). If desired, either after a certain preset time period has expired for leaving the message or by using a voice activation means that operates when there is a termination or extended gap in the voice of the caller that would indicate the end of the message, the switch 66 may be switched automatically back to its position connecting the line 68 to the line 72, etc. Another alternative is to have the signal which stops the tape transport in the answering machine (or a signal which is indicative of this state) operate a solenoid which switches switch 66 back to its original position.

An embellished embodiment of the invention, depicted in FIG. 2, includes a tone detector and controller device 18 that, as described immediately below, operates in response to the detection of specified signals, to control switch unit 16 so that line 80 is coupled to recording apparatus 14, irrespective of the switch condition most recently manually effected by the user.

Figure 2:
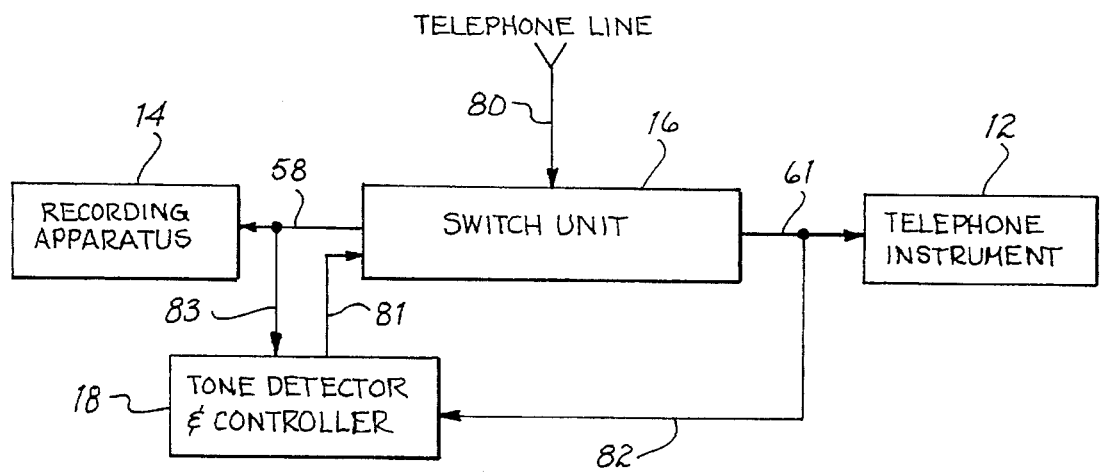
FIG. 2 depicts an embellished embodiment of the invention.
Figure 3:
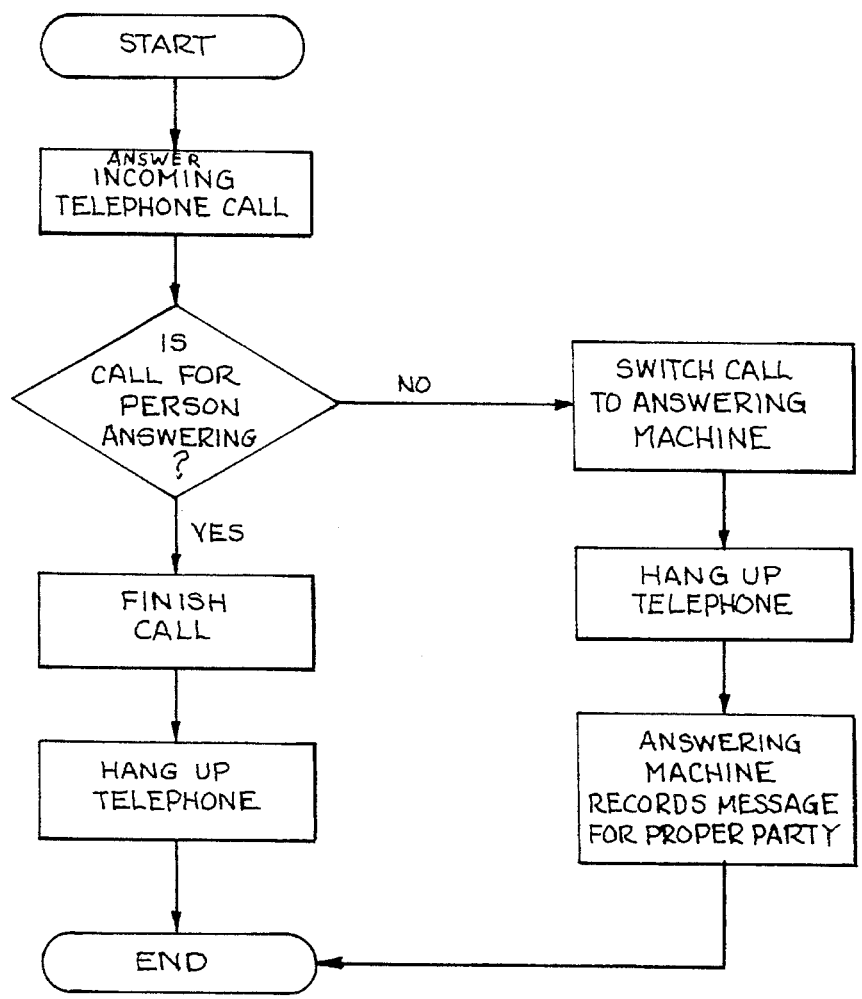
FIG. 3 shows a flow chart indicating the operation of the telephone answering device and method.

As may be seen from FIG. 2, device 18 has a first input coupled through a line 82 to line 61, a second input coupled through a line 83 to line 58 and, therefrom, to the input of recording machine 14, and an output coupled through a line 81 to switch unit 16.

As to operation, assume that switch unit 16 is disposed so that telephone line 80 is coupled to line 61. After a preset number of telephone rings or, if desired, a certain, preselected time period, a solenoid (not shown) would automatically operate switch 66 to make contact with line 76, thereby providing a telephone line connection to answering machine 14 via line 58. The caller may then remotely access recording machine 14 by transmitting a code of specified predetermined tones to device 18. The command tones may be constituted of defined combinations of the DTMF signals. Device 18 then detects the tones and causes a control signal to appear on line 81. The control signal will automatically cause line 80 to be connected to line 58 and, therefrom, to the messages on the recording machine 14. In this manner, the caller is able to access machine 14 and play back messages received on the machine.

While the invention has been described in its preferred embodiment, it is to be understood that the words which have been used are words of description rather than limitation and that changes may be made within the purview of the appended claims without departing from the true scope and spirit of the invention in its broader aspects, for example, the answering or message recording machine 14 as described herein records selected incoming messages but can also, if desired, be a machine that plays an outgoing message.

We claim:

1. A telephone answering device comprising, in combination:

a telephone instrument;

at least one message recording machine;

person actuated switching means coupled to the telephone instrument and to the message recording machine for permitting a person who answers an incoming call via the telephone instrument switch the incoming call from the telephone instrument to the message recording machine, wherein the message recording machine can record a message from a calling party after disconnecting the telephone instrument from the incoming call to prevent the person from both recording and hearing over the telephone instrument the message from the calling party that is being recorded on the message recording machine; and tone detector and controller means coupled to the telephone instrument, to the person actuated switching means and to the message recording machine for automatically coupling a telephone line over which the incoming call is received, through the person actuated switching means, to the message recording machine in response to a predetermined tone code received during the incoming call, irrespective of the most recently manually effected condition of the person actuated switching means.

2. A telephone answering device comprising, in combination:

a telephone instrument;

at least one message recording machine; and person actuated switching means coupled to the telephone instrument and to the message recording machine for permitting a person answering a call via the telephone instrument to switch the call by making a connection to the message recording machine just before breaking a connection with the telephone instrument, after which the message recording machine can record a message from a calling party after the person answering the call first speaks to the calling party.

3. The device of claim 2 wherein the person actuated switching means includes three way switch means for making a connection to the message recording machine and breaking a connection to the telephone instrument when the three way switch means is moved to couple the call to the message recording machine.

4. The device of claim 2 wherein a first line is provided for coupling the person actuated switching means to the telephone instrument; and a second line is provided for coupling the person actuated switching means to the message recording machine.

5. The device of claim 2 wherein the person actuated switching means comprises a switch having at least two positions;

one of the at least two positions for connecting an incoming call to the telephone instrument to allow the person answering the call to talk to the calling party on the telephone instrument; and the other one of the at least two positions for connecting the incoming call to the message recording machine so the calling party can record a message.

6. The device of claim 2 wherein means are provided for mechanically connecting the switching means to the telephone instrument.

7. The device of claim 2 wherein the message recording machine comprises a plurality of cassette means for allowing the message recording machine to record the message on a selected one of the plurality of cassette means.

8. The device of claim 7 further including cassette selection means for selecting one of the plurality of cassette means for allowing the message recording machine to record the message.

* * * * *